(12) United States Patent
Walker

(10) Patent No.: US 7,478,229 B2
(45) Date of Patent: Jan. 13, 2009

(54) APPARATUS AND METHODS FOR DEVICE CONFIGURATION AND MANAGEMENT

(75) Inventor: Philip M. Walker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 10/386,189

(22) Filed: Mar. 11, 2003

(65) Prior Publication Data
US 2004/0181610 A1      Sep. 16, 2004

(51) Int. Cl.
*G06F 9/24* (2006.01)
(52) U.S. Cl. .................... 713/1; 713/100; 709/250
(58) Field of Classification Search .......... 713/100, 713/1; 709/250
See application file for complete search history.

(56) References Cited

U.S. PATENT DOCUMENTS

| | | | | |
|---|---|---|---|---|
| 5,428,748 A | * | 6/1995 | Davidson et al. | 710/9 |
| 5,530,887 A | * | 6/1996 | Harper et al. | 710/104 |
| 6,301,612 B1 | * | 10/2001 | Selitrennikoff et al. | 709/220 |
| 6,748,515 B1 | * | 6/2004 | Hendrickson et al. | 712/32 |
| 7,024,539 B2 | * | 4/2006 | Bresemann et al. | 712/36 |
| 7,080,244 B2 | * | 7/2006 | Natu et al. | 713/1 |
| 2001/0049174 A1 | * | 12/2001 | Pitts et al. | 438/381 |
| 2003/0204714 A1 | * | 10/2003 | Rothman et al. | 713/100 |
| 2004/0010678 A1 | * | 1/2004 | Whitt | 713/1 |
| 2004/0109017 A1 | * | 6/2004 | Rothman et al. | 345/735 |

* cited by examiner

*Primary Examiner*—Thomas Lee
*Assistant Examiner*—Vincent T Tran

(57) ABSTRACT

An attachable device configured to operate with an operating system (OS) to provide a specific computing capability to a computer system associated with the OS. The attachable device includes circuitry for providing the specific computing capability and an independent device communication path. The independent device communication path is configured to allow first data in the attachable device to be configured independent of the OS. There is further included an independent power source independent of a power source that triggers a boot cycle of the OS, wherein the first data is capable of being configured while the OS is in an inactive state.

10 Claims, 4 Drawing Sheets

APPARATUS AND METHODS FOR DEVICE CONFIGURATION AND MANAGEMENT

BACKGROUND OF THE INVENTION

Due to the multitude of ways that computers can be utilized nowadays, different users may require different capabilities in their computer systems. To configure a computer system to fit a particular user's needs, various attachable devices may be plugged into the communication bus of a typical computer system to endow it with the desired computing capabilities.

By way of example, in a typical desktop computer system employing an Intel-based processor (available from Intel Corporation of Santa Clara, Calif.) and a Windows-based operating system (available from Microsoft Corporation of Redmond, Wash.), a variety of attachable devices such as network interface cards and internal/external disk drives may be attached to the CPU (central processing unit) via the system bus. During the OS (operating system) installation process or upon the initial attachment of an attachable device, a device installation process is undertaken. During installation, the identification data associated with the attachable device is recorded with the OS (e.g., in the registry), along with the device configuration data provided by the user and/or automatically obtained by the OS. Installation is necessary since different devices may have different requirements, and the OS needs to know how to configure the devices during booting so that the devices can be properly utilized after boot up.

Consider an exemplary computer system having two network interface cards (NICs) connected to two different networks, for example. During installation, the identification data of the NICs (e.g., the MAC address in the case of an Ethernet card), along with any necessary configuration data, needs to be stored by the OS. During the subsequent system boot up, the OS looks up the identification data associated with each NIC and obtains the associated configuration data to configure each NIC to communicate properly with its respective network.

In the aforementioned Windows-based computer system, the OS is typically stored on a hard disk that is hardwired to the CPU, which is in turn hardwired to the set of attachable devices that make up the user's computer system. This is the typical situation with most desktop, laptop, and networked computers of today. After the attachable devices are installed, the OS generally expects to see the same set of attachable devices each time the computer system boots up.

Whenever the OS detects a new device whose identification data does not match with the identification data stored in the registry, the OS requires that either a manual or an automatic installation process be undertaken. Since the installation of a new device is a rather infrequent event for most users of computers today, the requirement has up to now been tolerated by most users.

It should be noted that although the term registry is often associated with the system configuration database in Microsoft OS products, it is intended here as a generic term referring to the equivalent datastore of any and all OS products, however they might be named or implemented. For example, a version of the Linux OS may store system configuration data in a variety of individual files, e.g., /etc/services, etc. In these cases, it is intended that these datastores be covered by the generic term registry.

A new computer technology, known as utility computing, has presented a different set of challenges. With utility computing, the user is no longer assigned to a fixed CPU, a fixed boot device (e.g., the hard disk on which the OS is stored) or a fixed set of attachable devices. In utility computing, a service provider provides the computer user with the required computing capability via a network connection, using hardware and software resources selected from a common pool or resources maintained by the service provider. For example, the service provider may maintain, for thousands of OS images associated with thousands of users, thousands of CPUs on different racks, a vast number of disk drives and network interface cards, the majority of which are networked to communicate with one another via networking technology. When the user logs in, the service provider ascertains the hardware/software resources available, selects from the available resources a subset that can furnish the computing capability required by the user, and configures the network to connect the selected subset of resources together so that the user can begin to utilize the furnished computing capability to accomplish his computing task.

Thus in utility computing, while the user can obtain the needed computing capability from the service provider, there is no guarantee that the user would be assigned the same CPU or the same set of attachable devices each time the user logs in. Note that the user is, however, still associated with a particular OS image. This is because the user generally wants the same computing experience and wants to access to the same set of tools and settings across different computing sessions.

Since the OS image, upon user log-in and boot up, may see a different set of attachable devices from the set of attachable devices employed in the last computing session, the OS image may perceive the need to initiate the installation process for the "new" devices. If the service provider maintains a large number of devices, the chance of a user being assigned the same device twice may be slim, and the user may need to endure the time-consuming installation processes for the various devices in the selected set almost every time the user logs in. Unless a solution is found, the repetitive and tedious installation processes tend to discourage most users after a few log in sessions, thereby hampering the adoption of utility computing.

SUMMARY OF THE INVENTION

The invention relates, in one embodiment, to an attachable device configured to operate with an operating system (OS) to provide a specific computing capability to a computer system associated with the OS. The attachable device includes circuitry for providing the specific computing capability and an independent device communication path. The independent device communication path is configured to allow first data in the attachable device to be configured independent of the OS. There is further included an independent power source independent of a power source that triggers a boot cycle of the OS, wherein the first data is capable of being configured while the OS is in an inactive state.

In another embodiment, the invention relates to a method for configuring an attachable device to work cooperatively with an operating system (OS) of a computer system. The method includes ascertaining expected data for a device having the same device type as the attachable device, the expected data representing data to be received by the OS in order to avoid installation of the attachable device by the OS. The method further includes configuring the attachable device with the expected data prior to booting up the OS. The method additionally includes coupling the OS with the attachable device to enable the OS to utilize a computing capability associated with the attachable device after the OS is booted up.

In yet another embodiment, the invention relates to a computer system having a central processing unit associated with the computer system, and an operating system (OS) configured to execute on the central processing unit. The computer system further includes an attachable device configured to operate with the operating system (OS) to provide a computing capability to the computer system. The attachable device includes memory for storing identification data and an independent device communication path configured to allow the identification data to be modified independent of the OS. The identification data, when modified to match data expected by the OS, prevents the OS from initiating an installation process for the attachable device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
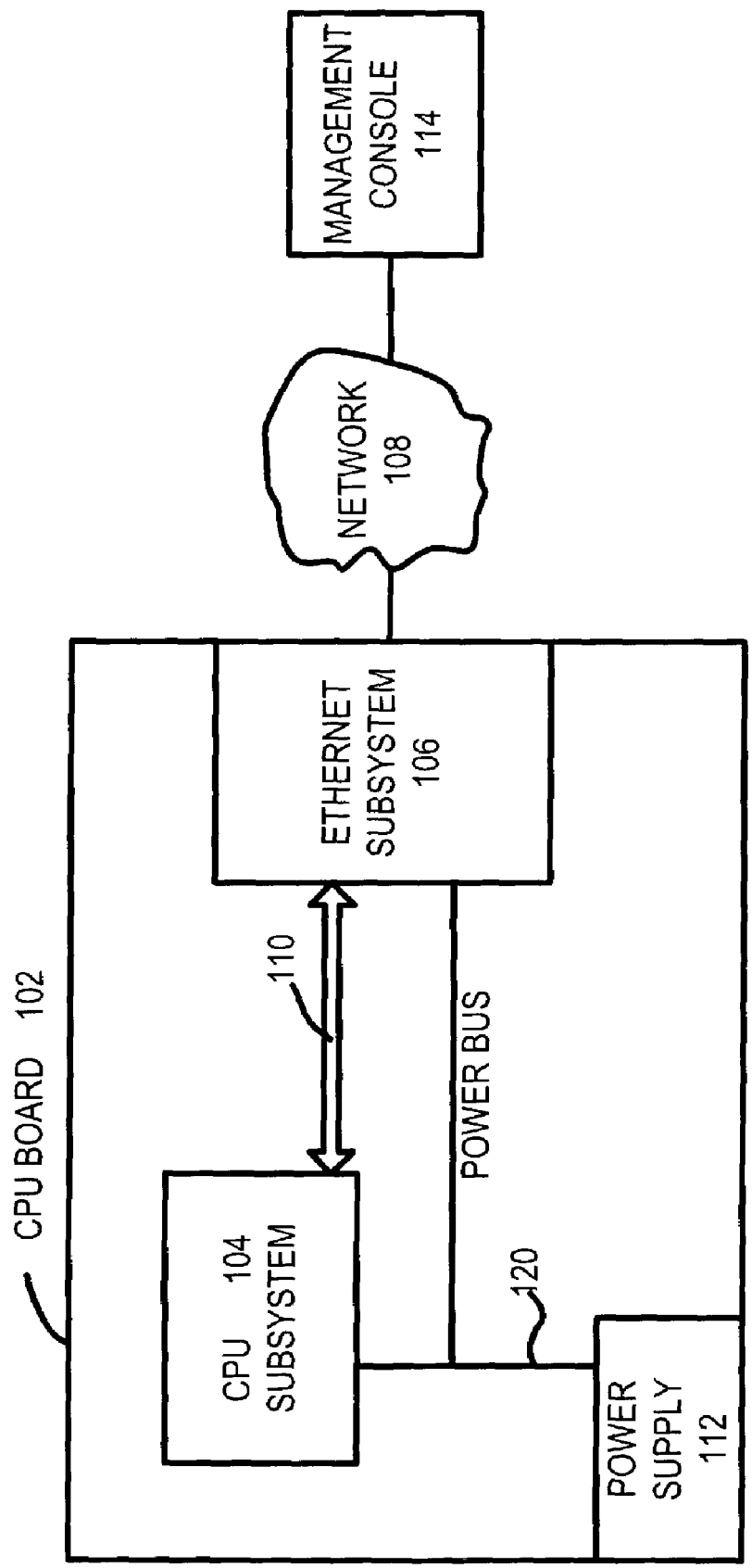
FIG. 1 is a prior art drawing of a CPU board, representing a type of attachable device.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided techniques for configuring an attachable device with device identification data matching that expected by a user's OS image. The configuration takes place before OS image booting to prevent the OS image from initiating the installation process.

In one embodiment, each attachable device is provided with an independent device communication path that allows that attachable device to be accessed for the purpose of configuring the attachable device identification data and/or performing other management tasks without the involvement of the OS. With the ability to access the attachable devices directly to change the attachable device identification data even before the OS image is booted up, the invention advantageously prepares the attachable devices in advance of OS booting such that when the OS image boots up, the OS image sees the expected device identification data from the attachable devices and thus has no need to initiate the device installation process.

As the term is employed herein, identification data refers to any data employed by the the OS to identify and/or recognize a particular attachable device for the purpose of deciding whether installation is necessary. For example, identification data may include (but not limited to) one or more of the manufacturer's name, the manufacturer's serial number, the model name and/or number, the size of DRAM buffers reported to the OS. Identification data may also include the communication protocol. For example, certain attachable devices such as network cards often have a backward compatibility mode where they mimic an older standard device. The protocol could be changed to match that expected by the OS image to avoid the need for installation.

As another example, plug-and-play devices report a variety of information, and selected portions of this information may be rendered configurable, including device name, manufacturer's name, etc. As a further example, although most Ethernet cards are indexed by NIC address, SCSI devices may be identified in the Windows registry by their Inquiry ID (an identifier string returned by the device in response to a SCSI Inquiry command). This ID would therefore be a possible candidate for modification on an attachable device that is able to provide the required functionality.

In one embodiment, there is provided an independent power source with each attachable device to facilitate the aforementioned independent device communication. The power source is preferably independent from the power source that triggers OS booting to allow the attachable device to be configured prior to OS booting.

However, the independent power supply is not absolutely necessary in all embodiments. For example, the BIOS services available on most modern motherboards may be employed to facilitate reconfiguration of attachable devices to avoid the need for installation. In one embodiment, the device reconfiguration services of the BIOS (typically accessible on most Intel based systems by pressing the F10 or DEL key early in the BOOT process, for example) could be used to reconfigure various devices prior to (or instead of) OS boot services. An automated reconfiguration may be achieved by treating a USB keyboard as a communication port. Alternatively or additionally, it would be advantageous to provide a specific protocol in the BIOS for this purpose. In this embodiment, the BIOS may be modified to support an automated reconfiguration protocol (optional), or automated interaction with existing BIOS reconfiguration services (e.g., via USB), and the attachable devices would support reconfigurability of the identification data in the manner described herein. It should be understood, therefore, that the various embodiments of the invention described herein may be adapted to work with either an independent power source or with a BIOS-based approach.

Advantageously, there is no need to modify the OS or the device identification data in the OS registry. This may be an important consideration since the modification of the OS is likely to be impractical due to the lack of access to the OS source code, which is typically kept secret by OS manufacturers. Furthermore, the OS manufacturer may prohibit, via licensing for example, the unauthorized modification of the OS. Likewise, the OS manufacturer may prohibit tampering with the device identification data stored in the OS registries. With the present invention, any off-the-shelf OS may be employed without modification.

These and other features and advantages of the present invention may be better understood with reference to the drawings and discussions that follow. FIG. 1 is a prior art drawing of a CPU board 102, representing a type of attachable device. As the term is employed herein, an attachable device represents a device or subsystem that may be detachably coupled to an OS image to extend the computing capability of the computer system formed thereby. The computer system formed may represent a utility computer system (i.e., one formed by the service provider to serve the user for the duration of a computing session), or it may even represent a conventional computer system, such as a desktop or laptop computer. For example, CPU boards and disk drives may be detachably coupled to the OS image, via the CPU bus or via an appropriate networking technology such as Ethernet. Unless the device identification data associated with the attachable device matches that expected by the OS image, the OS image generally require that the installation process be undertaken.

Figure 2:
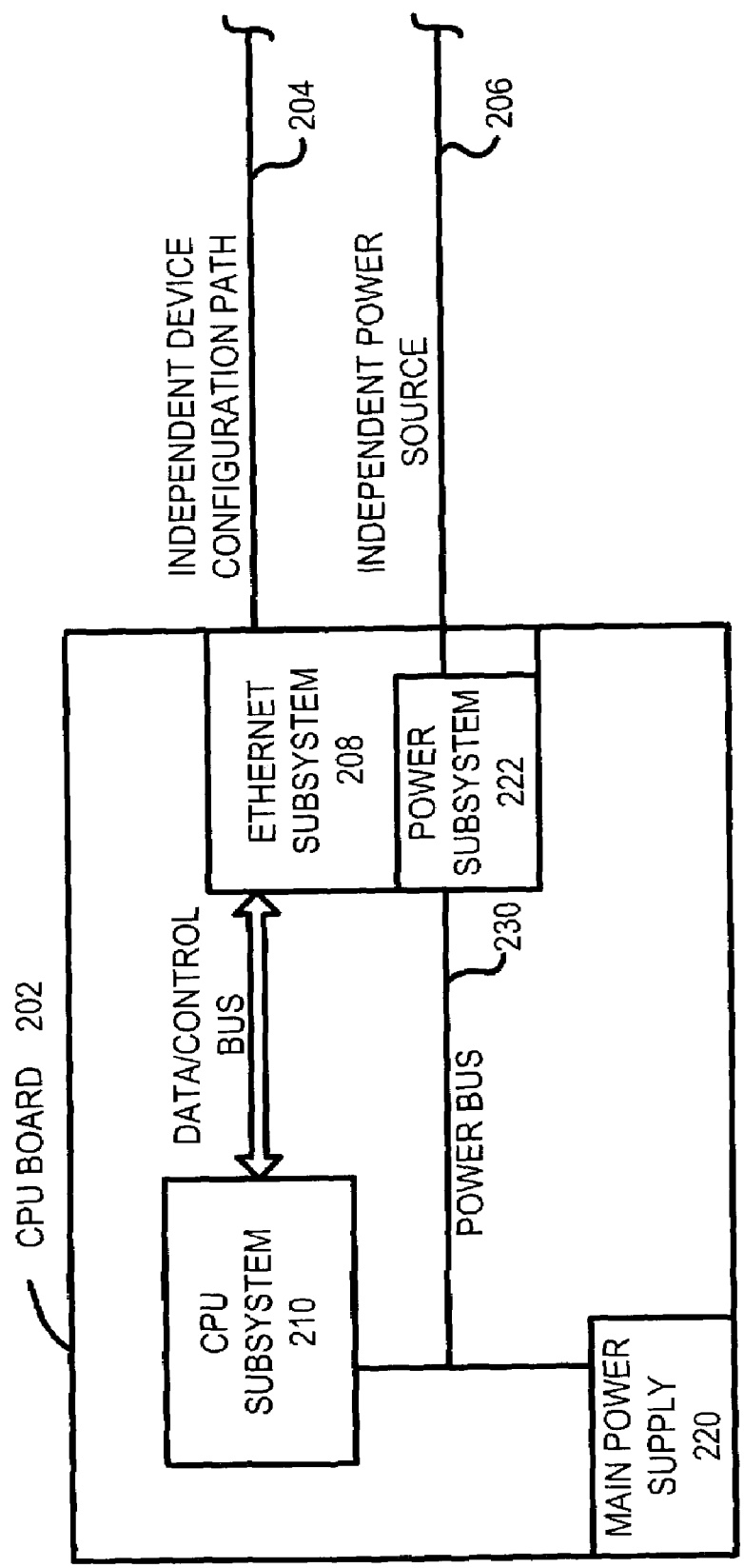
FIG. 2 shows, in accordance with one embodiment of the present invention, a CPU board in which there are provided an independent device configuration path and an independent power source.

CPU board 102 includes the actual CPU capability, which is implemented by CPU subsystem 104. In the example of FIG. 2, CPU board 102 represents one attachable device of the utility computer system to be formed. Accordingly, an Ethernet subsystem 106 is provided to allow CPU board 102 to communicate with the OS image and other attachable devices of the utility computer system via a network 108. Between Ethernet subsystem 106 and CPU subsystem 104, there is provided a data/control bus 110. A power supply 112 is provided to supply power to circuitry of CPU board 102, including CPU subsystem 104 and Ethernet subsystem 106 via a power bus 120.

When CPU board 102 is selected to implement a utility computer system, a management console 114 configures switching devices in network 108 to couple CPU board 102 to an OS image associated with a specific user, which OS image may be stored on a storage device at the utility computing resource facility of the service provider. CPU board 102 is generally not associated with any particular OS image until it is selected for use in a utility computer system. CPU board 102 may be selected simply because it may represent the only CPU board left available in the utility computing resource facility, or it may represent a random CPU board among the hundreds of CPU boards having the right CPU characteristics required by the user. Alternatively or additionally, CPU board 102 may be selected because it may represent the most efficient CPU board, from a network connectivity point of view, for implementing the utility computer system. The point is that a given OS image may be assigned to different CPU boards in different computing sessions.

In the case of prior art FIG. 1, Ethernet subsystem 106 cannot be independently configured by management console 114 without the involvement of the OS image executing on CPU subsystem 104. When power supply 112 turns on, the OS image would first boot up on CPU subsystem 104 and configure the various subsystems attached to the OS image. Once the OS image is satisfied that the attached subsystems are properly configured and/or installed, the OS image executing on CPU subsystem 104 would accept commands from management console 114 to configure Ethernet subsystem 106.

Unfortunately, in the utility computing context, the OS image when attached to CPU board 102 would likely detect that the device identification data associated with Ethernet subsystem 106 is different from that stored in its registry. This is because there is no guarantee in utility computing that the service provider would assign the same CPU board to the same OS image every time. In this case, the OS image may require that an installation process be undertaken. The same situation may happen with every attachable device (e.g., a hard disk) selected for use in the utility computer system. Depending on the number of attachable devices available in the utility computing resource facility (which may include thousands of CPU boards and other attachable devices), the user potentially has to suffer through the installation process thousands of times or more.

FIG. 2 shows, in accordance with one embodiment of the present invention, a CPU board 202 in which there are provided an independent device configuration path 204 and an independent power source 206. As the term is employed herein, an independent configuration path represents a communication path to selected subsystems in the attachable device to facilitate the configuration of certain data or aspects of the attachable device or to facilitate certain management tasks without OS involvement. An independent power source represents a power source to provide power to selected subsystems in the attachable device to facilitate the aforementioned configuration and/or management tasks without OS involvement. Preferably, the independent power source provides power independently of the power source that triggers a boot cycle of the OS image.

In the example of FIG. 2, independent power source 206 represents power supplied through an external power connection. The external power connection may be implemented by external connectors different from those employed to implement the independent device communication path or may be implemented the same external connectors. For example, certain networking technologies such as universal serial bus (USB) and Firewire may provide sufficient power to independently power Ethernet subsystem 208 without the need for an additional set of power conductors. As another example, the communication associated with independent device communication path 204 may take place through the same power conductors that provide independent power to Ethernet subsystem 208.

Together, independent device communication path 204 and independent power source 206 allow the device identification data in Ethernet subsystem 208 to be modified directly without the need to boot up the OS on CPU subsystem 210. By way of example, the MAC (Media Access Controller) address of Ethernet subsystem 208 may be configured or modified to match that expected by the OS image. Thus, when main power supply 220 is turned on to provide power to CPU subsystem 210 and Ethernet subsystem 208 (via a power bus 230 and power subsystem 222), the OS image will boot up on CPU subsystem 210 and see the MAC address matching that already stored in its registry. In this case, the OS image will boot without requiring that the installation process be undertaken.

In some cases, it may also be advantageous to accomplish certain management tasks without OS booting. For example, the utility computing resource facility may maintain a database of all attachable devices, along with their identification data, their operational status, their capabilities, and the like. The provision of an independent device communication path and an independent power source to each attachable device enables the management console to rapidly query and confirm that an attachable device is indeed available, that the identification data, the operational status, and the capabilities are as reported in the database, all without having to attach the device to an OS image and without having to suffer through the lengthy boot up of the OS image on a CPU to accomplish the aforementioned query. As an alternative to querying the attachable device, the attachable device may periodically broadcast information regarding itself (e.g., the NIC address of its Ethernet subsystem, the capacity of the disk drive if the attachable device is a disk drive, the status of the attachable device, and the like). This type of information is useful, for example, in situations where one needs to confirm the accuracy of the database for utility computer system provisioning and/or to confirm the data pertaining to a given attachable device before assigning that attachable device to a utility computer system in a given computing session. Other types of management tasks may also be accomplished similarly.

Figure 3:
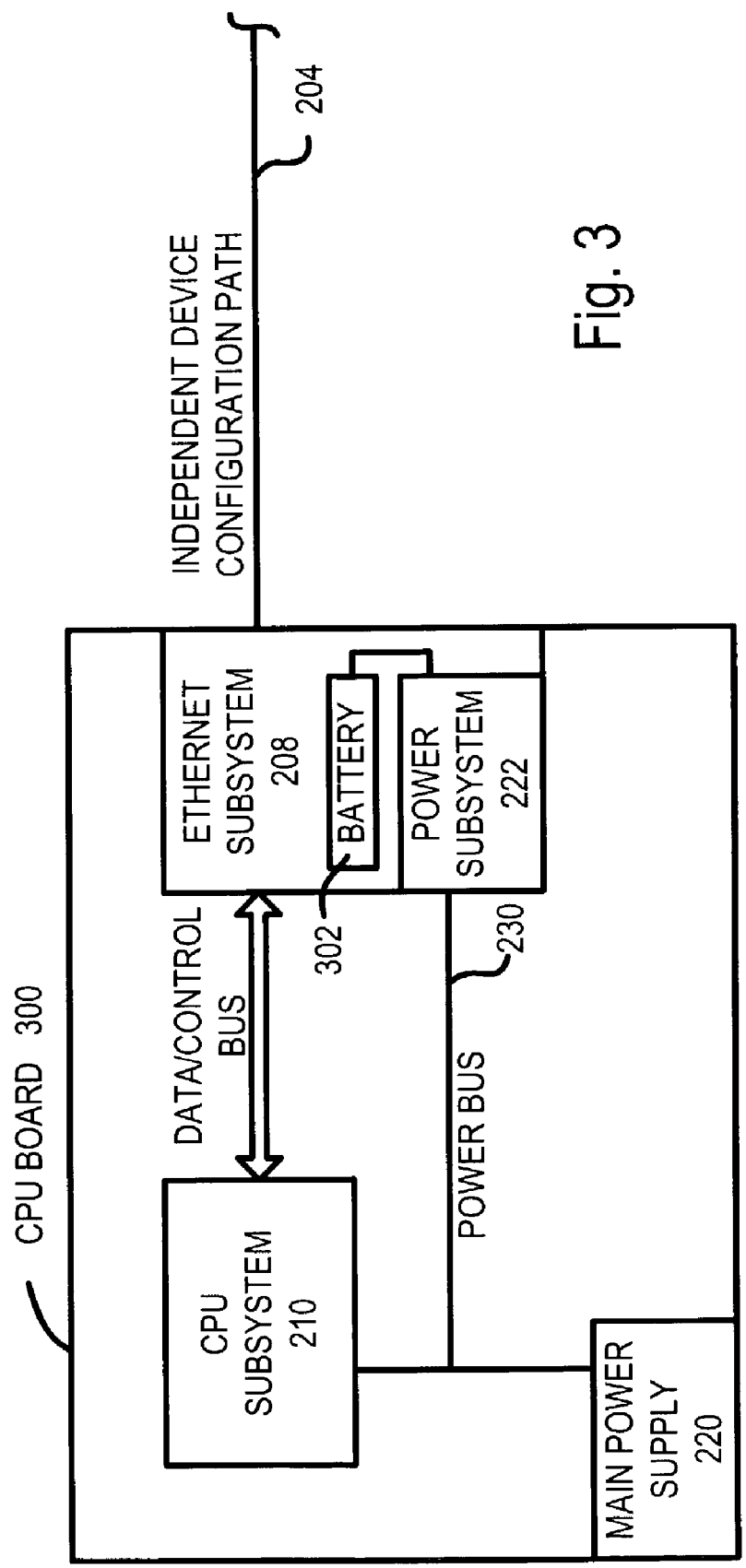
FIG. 3 shows, in accordance with another embodiment of the present invention, an alternative way to provide power to the attachable device.

FIG. 3 shows, in accordance with another embodiment of the present invention, an alternative way to provide power to CPU board 300. In the case of FIG. 3, the external power connection 206 of FIG. 2 has been replaced by a battery 302, which may represent for example a battery rechargeable by main power supply 220 via power subsystem 222.

Figure 4:
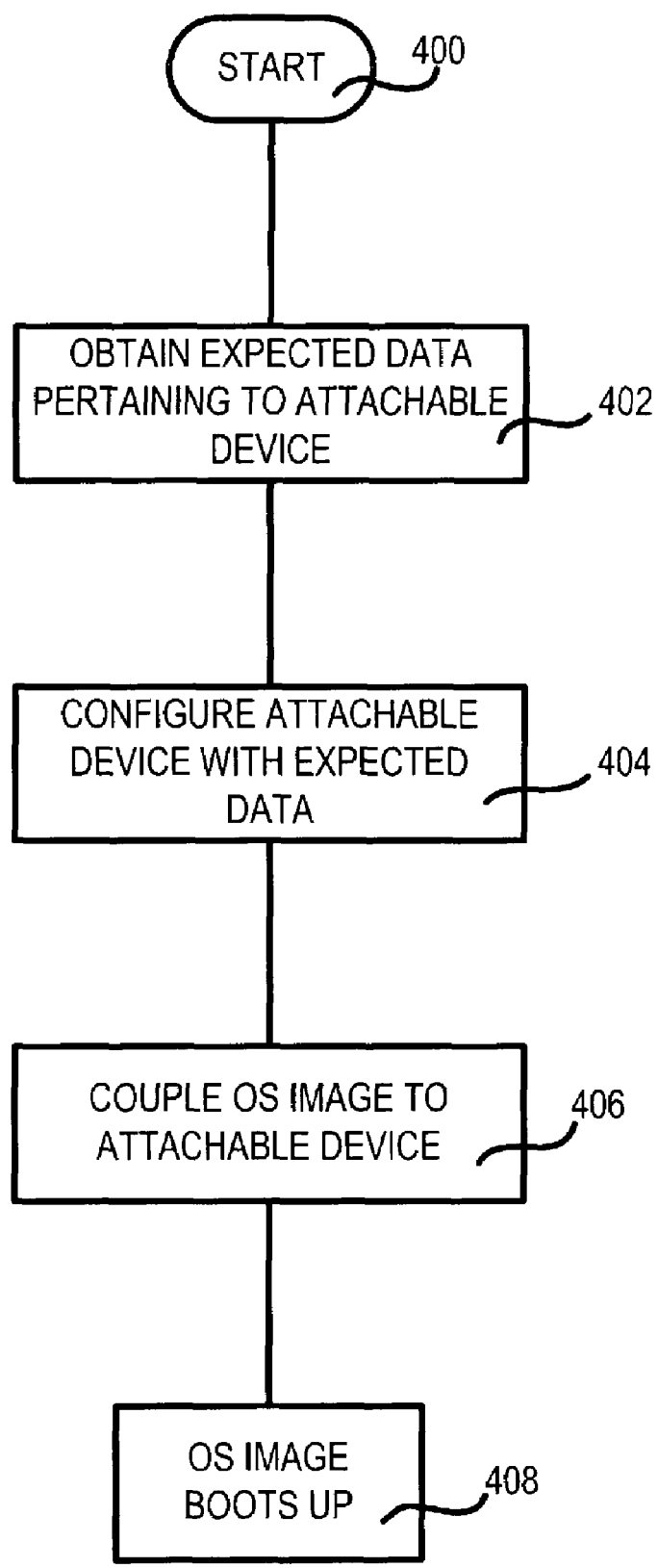
FIG. 4 illustrates, in accordance with one embodiment of the present invention, the relevant steps involved in configuring an attachable device for use with an OS image without triggering the installation process.

FIG. 4 illustrates, in accordance with one embodiment of the present invention, the relevant steps involved in configuring an attachable device for use with an OS image without triggering the installation process. In step 402, the expected data pertaining to the attachable device is obtained. The expected data in step 402 represents data that the OS expects to receive in order to avoid triggering an installation process for the attachable device. Preferably the attachable device in question should be of the same device type and/or having substantially the same functionality/capability as the device associated with the expected data. For example, if the OS image expects a specific serial number for a particular disk drive to which it was previously attached, the disk drive configured for attaching to the OS image in the current computing session should preferably be of substantially or exactly the same type.

The expected data may be obtained from a database maintained by the utility computing service provider, which database tracks the OS images for utility computer users and the expected data associated with each OS image. In the case of an Ethernet subsystem of an attachable device, for example, this expected data may represent a MAC address or NIC address. In the context of utility computing, the expected data may be obtained responsive to log in data associated with a specific user. The attachable device may represent any attachable device selected to create a utility computer system for use in the utility computing session. Note: in utility computing, the service provisioning phase (i.e., the configuration, attachment, and powering of various systems and services) must necessarily preceed any opportunity for a user to log in to provided hosts or services. In addition, many utility computing applications are entirely batch oriented. Therefore, the phrase "log in data" refers to the identity data provided during the process of authenticating a request for utility computing services, and not relative to the provided services themselves, which may or may not require or permit traditional logins.

In step 404, the attachable device is configured with the ascertained expected data prior to OS booting. As mentioned earlier, such configuration may be accomplished via the independent device communication path and the independent power source. In step 406, the OS image is coupled to or associated with the attachable device to allow the attachable device to furnish its computing capability to the computer system to be formed after the OS image boots up. Note that step 406 can occur prior to step 402 and/or 404 as long as OS booting does not occur until after the attachable device is configured with the ascertained expected data. In step 408, the OS image boots up.

As can be appreciated from the foregoing, the invention advantageously allows the OS image to be attached to different attachable devices without triggering an installation process. Since the device identification data is modified in the attachable device prior to OS image booting, the OS image sees the expected device identification data from the attachable devices and thus does not initiate the device installation process. Furthermore, the invention accomplishes its goals without requiring any modification to the OS code or to the data stored in the OS registry.

The provision of the independent device communication path and the independent power source with each attachable device also facilitates auditing and/or other management tasks on the attachable devices without the need to undergo OS booting. Because the time-consuming OS booting cycle(s) are no longer required, auditing and/or other management tasks on the attachable devices can be accomplished efficiently and with minimal impact to overall performance.

The provision of the independent device communication path and the independent power source allows the management console to query an attachable device for its device identification data. In one embodiment, the device identification data may then be provided to a translation table to allow such device identification data to appear to the OS image as the expected device identification data. Using the translation table as an intermediary, communication can take place between the OS image and the attachable device even if the device identification data stored by the OS image and the device identification data of the attachable device are different.

Although the discussion thus far has focused on the more commercially practical approach of modifying the device identification data to match that expected by the OS image, there is no technical reason preventing the application of the invention to modify the OS image to match the device identification data of the attachable device. In one embodiment, it is possible to employ the independent device communication path and the independent power source to query the attachable device for its device identification data prior to OS booting. The device identification data may then be furnished to the OS image so that the OS image can be modified to expect the same device identification data. For example, the OS registry can be reconfigured prior to OS booting with the ascertained device identification data to avoid triggering the installation process.

While this invention has been described in terms of several preferred embodiments, there are alterations, permutations, and equivalents which fall within the scope of this invention. It should also be noted that there are many alternative ways of implementing the methods and apparatuses of the present invention. For example, although the examples involve the Windows operating system, the invention also applies to other operating systems, such as HP/UX, Linux, Solaris, MacOS, and the like. Likewise, although the examples are discussed in connection with an Intel-based processor, the invention also applies to other processor platforms, including RISC (reduced instruction set computing) processors, PA-RISC processors (available from Hewlett-Packard, Inc. of Palo Alto, Calif.), or SPARC processors (available from Sun Microsystems, Inc. of Mountain View, Calif.). Similarly, although Ethernet is employed as the exemplary networking technology in the examples, the invention also applies to any other suitable networking technology. It is therefore intended that the following appended claims be interpreted as including all such alterations, permutations, and equivalents as fall within the true spirit and scope of the present invention.

What is claimed is:

1. A method for configuring an attachable device to work cooperatively with an operating system (OS) of a computer system wherein said OS represents an OS image associated with a specific user and wherein said computer system is a utility computer system, said method comprising:

receiving log in data from said specific user;

ascertaining said OS image associated with said specific user;

ascertaining expected data for a device having the same device type as said attachable device, said expected data representing data to be received by said OS in order to avoid installation of said attachable device by said OS;

configuring said attachable device with said expected data prior to booting up said OS; and coupling said OS with said attachable device to enable said OS to utilize a computing capability associated with said attachable device after said OS is booted up.

2. The method of claim 1 further comprising selecting said attachable device among a pool of devices available in a utility computing resource facility, said attachable device being selected responsive to information ascertained from said OS image.

3. The method of claim 1 wherein said expected data includes a serial number of said attachable device.

4. The method of claim 1 wherein said expected data includes identification data of said attachable device, said expected data being stored in at least one registry associated with said OS.

5. The method of claim 1 wherein said attachable device represents a network interface card and said expected data includes a MAC address.

6. The method of claim 1 wherein said attachable device is coupled to a data bus of a CPU, said CPU representing a CPU on which said OS executes.

7. The method of claim 6 wherein said attachable device is coupled to said data bus through a network connection.

8. The method of claim 7 wherein said attachable device implements a storage device.

9. The method of claim 7 wherein said network connection is an Ethernet connection.

10. The method of claim 1 wherein said expected data is ascertained from a database, said database includes information pertaining to said OS and said expected data.

* * * * *